United States Patent
Kaku (10) Patent No.: US 11,893,695 B2
(45) Date of Patent: *Feb. 6, 2024

(54) VIRTUAL REALITY SIMULATOR AND VIRTUAL REALITY SIMULATION PROGRAM

(71) Applicant: TOYOTA JIDOSHA KABUSHIKI KAISHA, Toyota (JP)

(72) Inventor: Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,642

(22) Filed: May 26, 2022

(65) Prior Publication Data

US 2023/0008807 A1 Jan. 12, 2023

(30) Foreign Application Priority Data

Jul. 12, 2021 (JP) ................................. 2021-115015

(51) Int. Cl.
*G06F 3/01* (2006.01)
*G06F 3/048* (2013.01)
(Continued)

(52) U.S. Cl.
CPC .............. *G06T 19/00* (2013.01); *G06F 3/011* (2013.01); *G06F 3/012* (2013.01); *G06F 3/016* (2013.01);
(Continued)

(58) Field of Classification Search
CPC .............. G06F 3/04845; G06F 3/04815; G06F 3/0488; G06F 3/04817; G06F 3/011;
(Continued)

(56) References Cited

U.S. PATENT DOCUMENTS 9,369,632 B2 * 6/2016 Short .................. H04N 9/3179
9,699,441 B2 * 7/2017 Inaba .................. H04N 13/296
(Continued)

FOREIGN PATENT DOCUMENTS

CN 110728749 A 1/2020
JP H11-252523 A 9/1999
(Continued)

OTHER PUBLICATIONS

May 11, 2023 Office Action issued in U.S. Appl. No. 17/830,710.
(Continued)

*Primary Examiner* — Vijay Shankar
(74) *Attorney, Agent, or Firm* — Oliff PLC (57) ABSTRACT

A VR (Virtual Reality) simulator projects or displays a virtual space image on a screen installed at a position distant from a user in a real space and not integrally moving with the user. More specifically, the VR simulator acquires a real user position being a position of the user's head in the real space. The VR simulator acquires a virtual user position being a position in a virtual space corresponding to the real user position. Then, the VR simulator acquires the virtual space image by imaging the virtual space by using a camera placed at the virtual user position in the virtual space, based on virtual space configuration information indicating a configuration of the virtual space. Here, the VR simulator performs adjusts a focal length of the camera such that perspective corresponding to a distance between the real user position and the screen is cancelled.

3 Claims, 10 Drawing Sheets

(51) Int. Cl.
*G06T 19/00* (2011.01)
*G06F 3/04845* (2022.01)
*G06F 3/04817* (2022.01)
*G06F 3/04815* (2022.01)
*G06F 3/0488* (2022.01)

(52) U.S. Cl.
CPC ........ *G06F 3/0488* (2013.01); *G06F 3/04815* (2013.01); *G06F 3/04817* (2013.01); *G06F 3/04845* (2013.01)

(58) Field of Classification Search
CPC ..... G06F 3/012; G06F 3/016; G06T 2215/16; G06T 19/00; G06T 19/003
See application file for complete search history.

(56) References Cited

U.S. PATENT DOCUMENTS

| | | | |
|---|---|---|---|
| 11,205,303 | B2 | 12/2021 | Schowengerdt et al. |
| 2004/0246495 | A1 | 12/2004 | Abe |
| 2005/0168705 | A1 | 8/2005 | Li et al. |
| 2012/0257024 | A1* | 10/2012 | Inaba .................... H04N 23/67 348/E13.074 |
| 2014/0139717 | A1 | 5/2014 | Short |
| 2018/0262713 | A1 | 9/2018 | Huang et al. |
| 2019/0392554 | A1 | 12/2019 | Andersson |
| 2020/0005738 | A1 | 1/2020 | Ishii |
| 2020/0110947 | A1 | 4/2020 | Nakayama |
| 2021/0081051 | A1* | 3/2021 | Laaksonen .............. G06F 3/011 |
| 2021/0082187 | A1 | 3/2021 | Gavriliuc |
| 2021/0268386 | A1 | 9/2021 | Sato |
| 2021/0377505 | A1 | 12/2021 | Liu et al. |
| 2022/0066543 | A1* | 3/2022 | Rhyu ........................ G06F 3/14 |
| 2022/0317859 | A1* | 10/2022 | Jagannathan ........... G06F 9/451 |
| 2023/0007231 | A1 | 1/2023 | Kadam |
| 2023/0011121 | A1* | 1/2023 | Funazukuri ............. G06T 15/20 |
| 2023/0011228 | A1* | 1/2023 | Kaku .................. G02B 27/017 |
| 2023/0012029 | A1* | 1/2023 | Kaku ...................... G06F 3/012 |

FOREIGN PATENT DOCUMENTS

| | | |
|---|---|---|
| JP | 2000-312358 A | 11/2000 |
| JP | 2003-141573 A | 5/2003 |
| JP | 2004-110804 A | 4/2004 |
| JP | 3761563 B2 | 3/2006 |
| JP | 2018-056924 A | 4/2018 |
| JP | 2020-009295 A | 1/2020 |
| JP | 6772424 B2 | 10/2020 |
| WO | 2018/221209 A1 | 12/2018 |

OTHER PUBLICATIONS

U.S. Appl. No. 17/825,463, filed May 26, 2022 in the name of Wataru Kaku.
Sep. 7, 2023 Office Action issued in U.S. Appl. No. 17/830,710.
Sep. 8, 2023 Office Action issued in U.S. Appl. No. 17/825,463.
Treyer et al, "Using a shifted lens to achieve visual depth in facade projections more efficiently", https://doi.org/10.3929/ethz-a-007598076. (Year: 2012).

* cited by examiner

VIRTUAL REALITY SIMULATOR AND VIRTUAL REALITY SIMULATION PROGRAM

CROSS-REFERENCE TO RELATED APPLICATION

This application claims priority to Japanese Patent Application No. 2021-115015 filed on Jul. 12, 2021, the entire contents of which are incorporated by reference herein.

BACKGROUND

Technical Field

The present disclosure relates to a virtual reality (VR) simulation. In particular, the present disclosure relates to a wearless VR simulation.

Background Art

Patent Literature 1 discloses an image display device. The image display device includes an image generation unit, a projector, and a detection unit. The image generation unit uses data of a space of a virtual world to generate an image of a part of the virtual world captured by a virtual camera set in the space of the virtual world. The projector moves integrally with a user and projects the image generated by the image generation unit onto a space of a real world. The detection unit detects a position of the projector and a projecting direction of the projector. The image generation unit moves the virtual camera in the space of the virtual world in conjunction with the movement of the projector. Moreover, the image generation unit sets the virtual camera such that its imaging direction becomes a direction corresponding to the projecting direction of the projector. When a direction of the user changes and thus the projecting direction of the projector changes, the imaging direction of the virtual camera also changes accordingly.

Patent Literature 2, Patent Literature 3, and Patent Literature 4 are other examples indicating a technical level in a technical field of the present disclosure at the time of application.

LIST OF RELATED ART

Patent Literature 1: Japanese Laid-Open Patent Publication No. JP-2018-056924
Patent Literature 2: Japanese Laid-Open Patent Publication No. JP-2003-141573
Patent Literature 3: Japanese Laid-Open Patent Publication No. JP-2000-312358
Patent Literature 4: Japanese Laid-Open Patent Publication No. JP-H11-252523

SUMMARY

A "wearless VR simulation" where a user is able to experience the VR without wearing a VR device such as a head-mounted display is considered. In the case of the wearless VR simulation, a screen is installed at a position distant from the user, and an image of a virtual world (virtual space) is drawn on the screen. In such the wearless VR simulation, it is desirable to suppress the user's feeling of strangeness as possible.

An object of the present disclosure is to provide a technique that can suppress the user's feeling of strangeness in the wearless VR simulation.

A first aspect is directed to a virtual reality simulator.
The virtual reality simulator includes:
one or more processors; and
one or more memory devices storing virtual space configuration information indicating a configuration of a virtual space.
The one or more processors are configured to execute:
a process of acquiring information on a real user position that is a position of a head of a user in a real space;
a process of acquiring information on a virtual user position that is a position in the virtual space corresponding to the real user position;
an imaging process that acquires a virtual space image by imaging the virtual space by using a camera placed at the virtual user position in the virtual space, based on the virtual space configuration information; and
a process of projecting or displaying the virtual space image on a screen that is installed at a position distant from the user in the real space and does not integrally move with the user.
The imaging process includes a perspective adjustment process that adjusts a focal length of the camera such that perspective corresponding to a distance between the real user position and the screen is cancelled.

A second aspect further includes the following feature in addition to the first aspect.
The one or more processors predict the real user position in future based on a past history of the real user position.
Then, the one or more processors execute the imaging process based on the virtual user position in future corresponding to the real user position in future.

A third aspect is directed to a virtual reality simulation program executed by a computer and performing a virtual reality simulation.
The virtual reality simulation program causes the computer to execute:
a process of acquiring information on a real user position that is a position of a head of a user in a real space;
a process of acquiring information on a virtual user position that is a position in a virtual space corresponding to the real user position;
an imaging process that acquires a virtual space image by imaging the virtual space by using a camera placed at the virtual user position in the virtual space, based on virtual space configuration information indicating a configuration of the virtual space; and
a process of projecting or displaying the virtual space image on a screen that is installed at a position distant from the user in the real space and does not integrally move with the user.
The imaging process includes a perspective adjustment process that adjusts a focal length of the camera such that perspective corresponding to a distance between the real user position and the screen is cancelled.

According to the present disclosure, it is possible to suppress the user's feeling of strangeness in the wearless VR simulation.

EMBODIMENTS

Embodiments of the present disclosure will be descried with reference to the attached drawings.

1. Outline of Wearless VR Simulation

Figure 1:
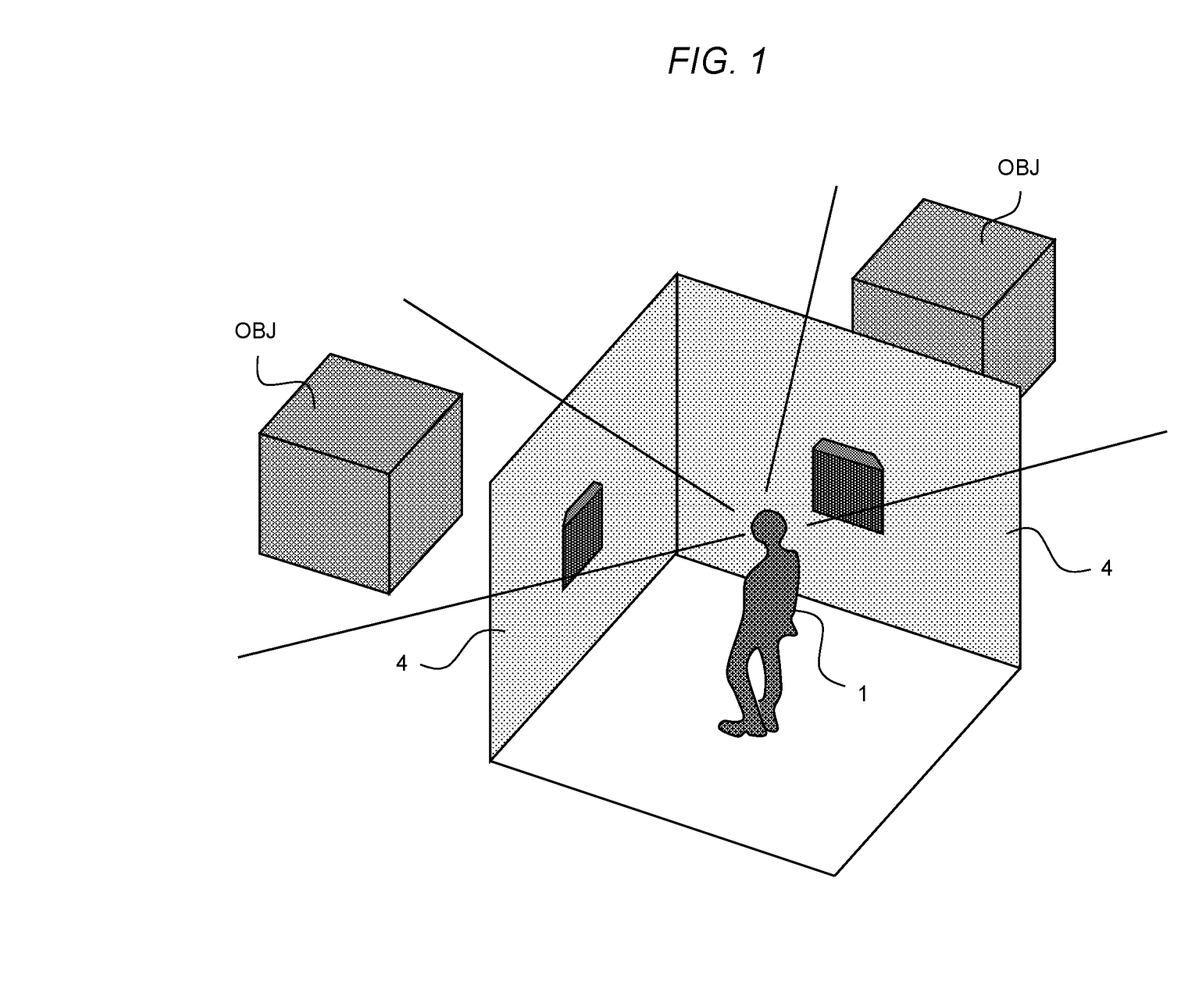
FIG. 1 is a conceptual diagram for explaining an outline of a wearless VR simulation according to an embodiment of the present disclosure.

FIG. 1 is a conceptual diagram for explaining an outline of a wearless VR (Virtual Reality) simulation according to the present embodiment. In the wearless VR simulation, a user 1 is able to experience the VR without wearing a VR device such as a head-mounted display.

More specifically, at least one screen 4 is installed at a position distant from the user 1. Unlike the head-mounted display, the screen 4 is independent of the user 1 and does not move integrally with the user 1. A position of the screen 4 may be fixed. The screen 4 may be installed vertically on the ground. A plurality of screens 4 may be installed around the user 1. The plurality of screens 4 may be seamlessly and continuously arranged. In the example shown in FIG. 1, a plurality of screens 4 are installed vertically on the ground and arranged seamlessly and continuously so as to be orthogonal to each other. The screen 4 may be larger than the user 1. The screen 4 is installed, for example, in a VR experience room.

An image of a virtual world (virtual space) is drawn on such the screen 4 distant from the user 1. For example, a projector is installed at a position away from the screen 4, and the image is projected from the projector onto the screen 4. As another example, the screen 4 may be a screen of a display device such as a liquid crystal display, an organic EL display, and the like. In that case, the image is displayed on the screen 4 of the display device. In the following description, "drawing an image on the screen 4" means projecting or displaying an image on the screen 4.

In the wearless VR simulation described above, it is desirable to suppress the user 1's feeling of strangeness as possible. For example, there is an object OBJ in the virtual world. It is desirable to draw the object OBJ on the screen 4 such that the object OBJ can be seen from a position of the user 1 without the feeling of strangeness. The feeling of strangeness being little means, for example, that distortion of the image of the object OBJ drawn on the screen 4 is little. As another example, the feeling of strangeness being little means that a sense of distance of the object OBJ drawn on the screen 4 is close to reality. As will be described later, the present embodiment provides a technique that can suppress the user 1's feeling of strangeness in the wearless VR simulation.

Major terms used in the present embodiment will be described with reference to FIG. 2.

A "real space SPr" is a space in which the user 1 and the screen 4 actually exist. In the real space SPr, at least one screen 4 is installed away from the user 1.

A "real space coordinate system (Xr, Yr, Zr)" is a coordinate system that defines the real space SPr. An origin of the real space coordinate system is set at an arbitrary position in the real space SPr. A Xr-axis, a Yr-axis, and a Zr-axis are orthogonal to each other. The Xr-axis and the Yr-axis represent horizontal directions, and the Zr-axis represents a vertical direction.

A "real user position Ur" is a position of user 1 in the real space SPr (i.e., the real space coordinate system). More specifically, the real user location Ur is a position of a head of the user 1 in the real space SPr. For example, the real user position Ur is a position of an eye of the user 1 in the real space SPr. The real user position Ur may be a center position of both eyes of the user 1 in the real space SPr.

A "virtual space SPv" is a space of a virtual world that is a target of the VR simulation. The virtual world is arbitrary. For example, the virtual world is a city. As another example, the virtual world may be a world of a game.

A "virtual space coordinate system (Xv, Yv, Zv)" is a coordinate system that defines the virtual space SPv. An origin of the virtual space coordinate system is set at an arbitrary position in the virtual space SPv. A Xv-axis, a Yv-axis, and a Zv-axis are orthogonal to each other. The Xv-axis and the Yv-axis represent horizontal directions, and the Zv-axis represents a vertical direction.

A "virtual user position Uv" is a position of user 1 in the virtual space SPv (i.e., the virtual space coordinate system).

The real space coordinate system (Xr, Yr, Zr) and virtual space coordinate system (Xv, Yv, Zv) are associated with each other in advance. Therefore, coordinate transformation between the real space coordinate system and the virtual space coordinate system is possible. That is, it is possible to convert any position in the real space coordinate system into a corresponding position in the virtual space coordinate system. Conversely, it is also possible to convert any position in the virtual space coordinate system into a corresponding position in the real space coordinate system. For example, it is possible to convert the real user position Ur into a corresponding virtual user position Uv. As another example, it is possible to convert the position of the screen 4 in the real space SPr into a corresponding position in the virtual space SPv. As yet another example, it is also possible to convert a position of the object OBJ in the virtual space SPv into a corresponding position in the real space SPr.

A "VR simulator 10" is a simulator that achieves the wearless VR simulation according to the present embodiment. The VR simulator 10 is present in the real space SPr. Hereinafter, the VR simulator 10 according to the present embodiment will be described in detail.

2. VR Simulator

2-1. Configuration Example of VR Simulator

Figure 3:
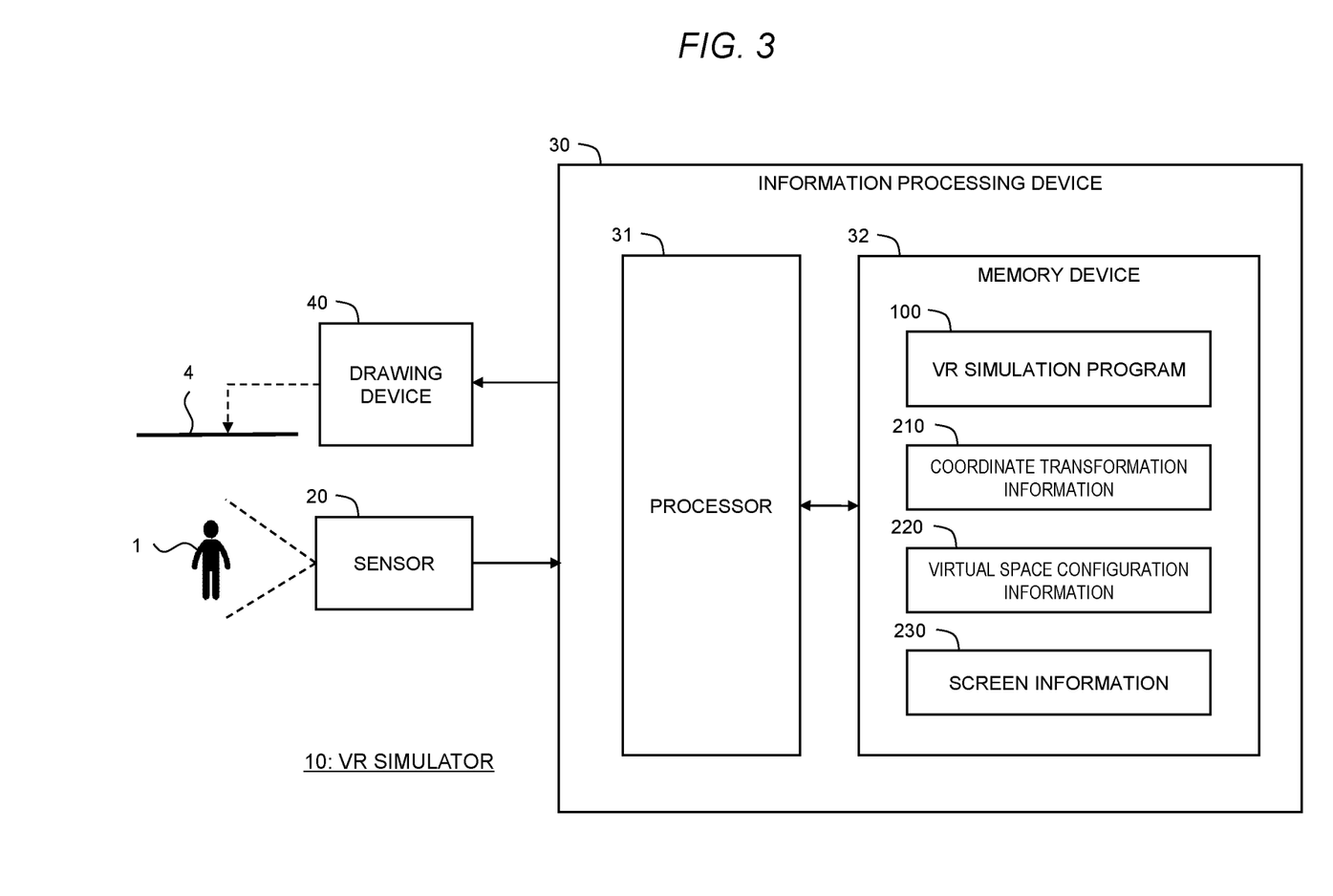
FIG. 3 is a block diagram showing a configuration example of a VR simulator according to an embodiment of the present disclosure.

FIG. 3 is a block diagram showing a configuration example of the VR simulator 10 according to the present embodiment. The VR simulator 10 includes a sensor 20, an information processing device 30, and a drawing device 40.

The sensor 20 detects information used for acquiring the real user position Ur. For example, the sensor 20 is a camera that images (i.e., captures an image of) the user 1. As another example, the sensor 20 may be a position sensor mounted on the head of the user 1. Various examples of a method for acquiring the real user position Ur by the use of the sensor 20 will be described in detail later.

The drawing device 40 draws an image on the screen 4. For example, the drawing device 40 is a projector. The projector is installed at a position away from the screen 4 and projects an image onto the screen 4. As another example, the drawing device 40 is a display device such as a liquid crystal display, an organic EL display, and the like. The display device is provided with a screen 4 and displays an image on its own screen 4.

The information processing device 30 is a computer that executes a variety of information processing. The information processing device 30 includes one or more processors 31 (hereinafter, simply referred to as a processor 31) and one or more memory devices 32 (hereinafter, simply referred to as a memory device 32). The processor 31 executes a variety of processing. For example, the processor 31 includes a CPU (Central Processing Unit). The memory device 32 stores a variety of information. Examples of the memory device 32 include a volatile memory, a non-volatile memory, an HDD (Hard Disk Drive), an SSD (Solid State Drive), and the like.

A VR simulation program 100 is a computer program that performs the wearless VR simulation. The wearless VR simulation according to the present embodiment is achieved by the information processing device 30 (the processor 31) executing the VR simulation program 100. The VR simulation program 100 is stored in the memory device 32. The VR simulation program 100 may be recorded on a non-transitory computer-readable recording medium. The VR simulation program 100 may be provided via a network.

Coordinate transformation information 210, virtual space configuration information 220, and screen information 230 are beforehand stored in the memory device 32.

Figure 2:
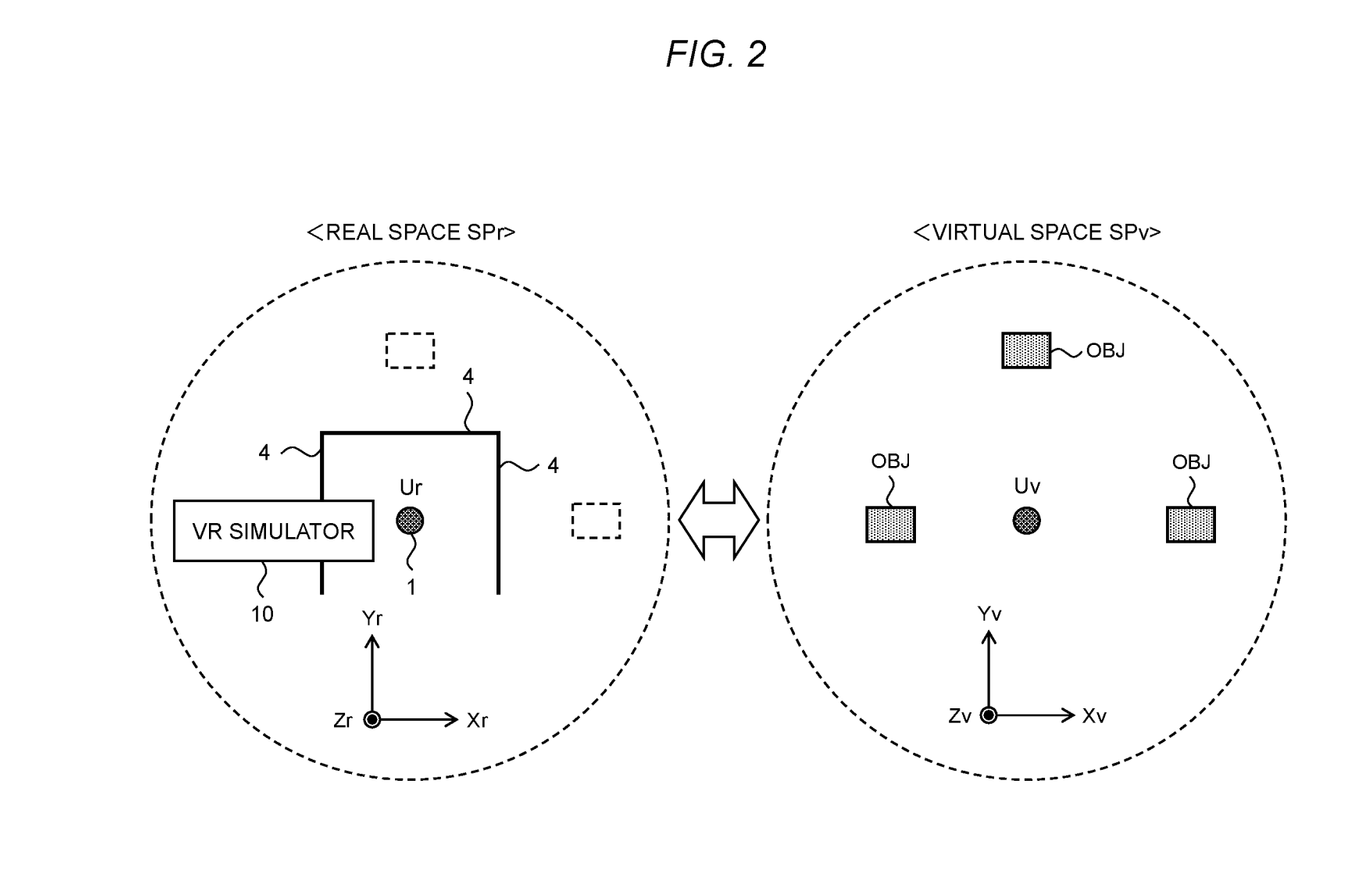
FIG. 2 is a conceptual diagram for explaining an outline of a wearless VR simulation according to an embodiment of the present disclosure.

The coordinate transformation information 210 indicates a correspondence relationship between the real space coordinate system (Xr, Yr, Zr) and the virtual space coordinate system (Xv, Yv, Zv) (see FIG. 2). Using the coordinate transformation information 210 makes it possible to perform the coordinate transformation between the real space coordinate system and the virtual space coordinate system.

The virtual space configuration information 220 indicates a configuration of the virtual space SPv. More specifically, there are a variety of objects OBJ in the virtual space SPv. The virtual space configuration information 220 indicates an occupancy range of each object OBJ in the virtual space SPv (i.e., in the virtual space coordinate system). For example, the virtual space configuration information 220 indicates a position, a size, and a shape of each object OBJ in the virtual space SPv (i.e., in the virtual space coordinate system).

The screen information 230 indicates information on each screen 4 installed in the real space SPr. More specifically, the screen information 230 indicates an occupancy range of each screen 4 in the real space SPr (i.e., in the real space coordinate system). For example, the screen information 230 indicates a position, a size, and a shape of each screen 4 in the real space SPr (i.e., in the real space coordinate system).

2-2. Example of Processing by VR Simulator

Figure 4:
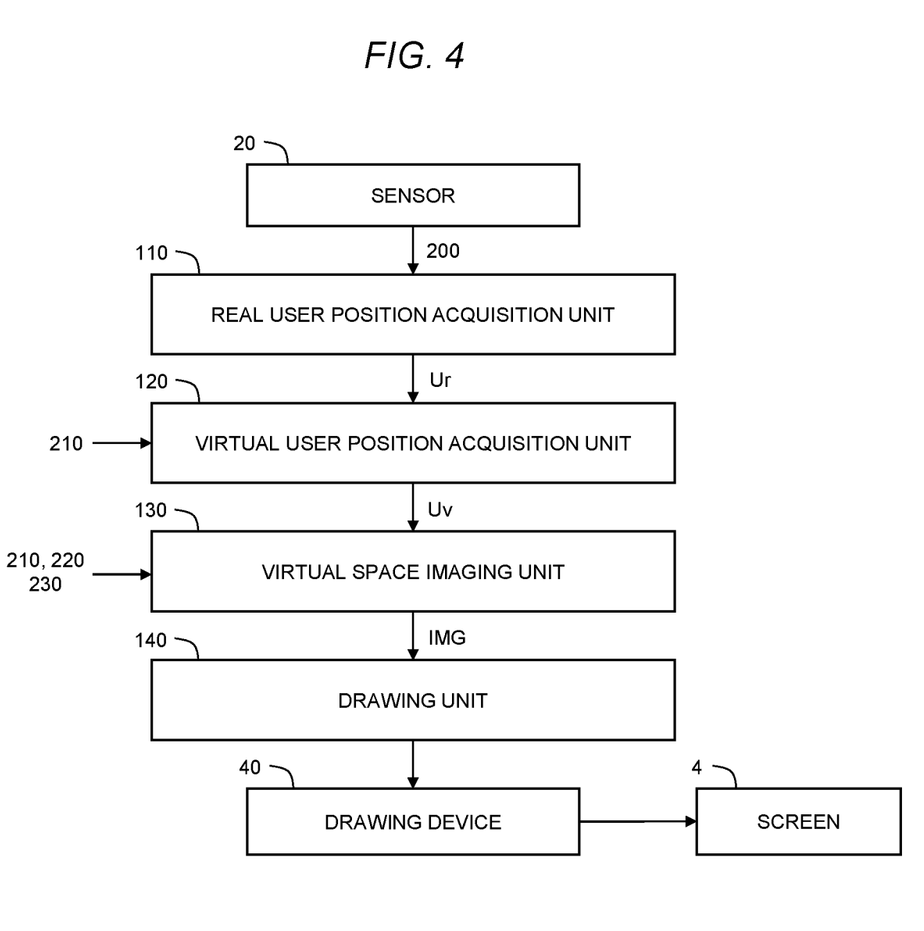
FIG. 4 is a block diagram showing a functional configuration example of a VR simulator according to an embodiment of the present disclosure.

FIG. 4 is a block diagram showing a functional configuration example of the VR simulator 10 according to the present embodiment. The VR simulator 10 includes a real user position acquisition unit 110, a virtual user position acquisition unit 120, a virtual space imaging unit 130, and a drawing unit 140 as functional blocks. These functional blocks are implemented by a cooperation of the processor 31 executing the VR simulation program 100 and the memory device 32.

Figure 5:
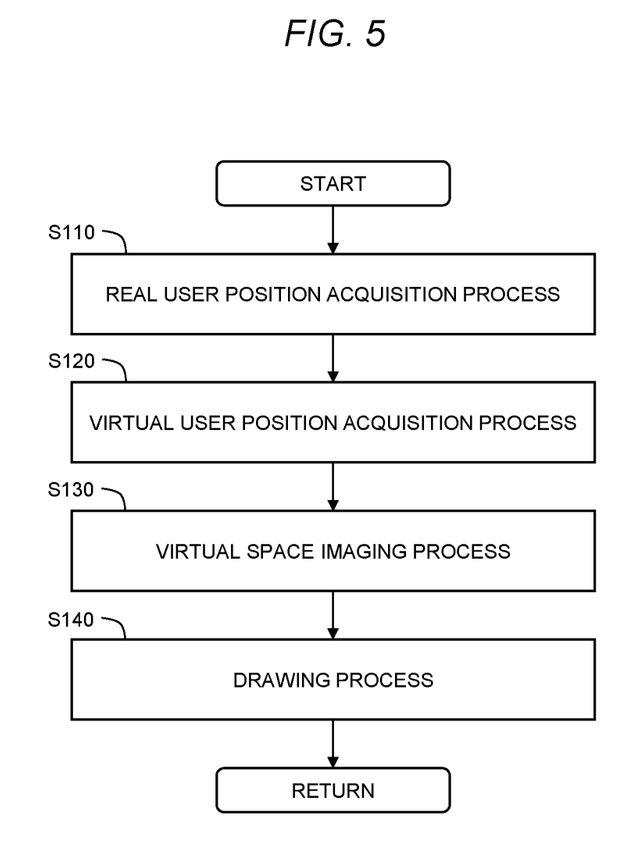
FIG. 5 is a flow chart showing processing by a VR simulator according to an embodiment of the present disclosure.

FIG. 5 is a flow chart showing processing by the VR simulator 10 according to the present embodiment. A process flow by the VR simulator 10 will be described with reference to FIGS. 4 and 5.

2-2-1. Step S110 (Real User Position Acquisition Process)

In Step S110, the real user position acquisition unit 110 acquires the real user position Ur in the real space SPr. As described above, the real user position Ur is the position of the head of the user 1 in the real space SPr. For example, the real user position Ur is the position of an eye of the user 1 in the real space SPr. As another example, the real user position Ur may be a center position of both eyes of the user 1 in the real space SPr.

More specifically, the sensor 20 installed in the real space SPr detects information used for acquiring the real user position Ur. Sensor-detected information 200 indicates a result of detection by the sensor 20. The real user position acquisition unit 110 acquires the sensor-detected information 200 from the sensor 20. The sensor-detected information 200 is stored in the memory device 32. Then, the real user position acquisition unit 110 acquires the real user position Ur based on the sensor-detected information 200. The information on the real user position Ur is stored in the memory device 32.

For example, the sensor 20 includes at least one camera that images (captures an image of) the user 1. For example, the camera is installed at a predetermined position in the VR experience room. Information on a installation position and a installation direction of the camera in the real space coordinate system is given in advance. The sensor-detected information 200 is an image of the user 1 captured by the camera. The real user position acquisition unit 110 recognizes the head (e.g., eyes) of the user 1 by analyzing the image of the user 1 indicated by the sensor-detected information 200. Then, the real user position acquisition unit 110 acquires the real user position Ur based on a relative position of the head of the user 1 viewed from the camera, the installation position and the installation direction of the camera.

As another example, the sensor 20 may be a position sensor mounted on the head of the user 1. For example, the position sensor is a ranging sensor that measures relative distances to a wall and a ceiling of the VR experience room. In that case, the sensor-detected information 200 is the relative distances measured by the position sensor. Information on positions of the wall and the ceiling in the real space coordinate system is given in advance. The real user position acquisition unit 110 is able to acquire the real user position Ur based on the positions of the wall and the ceiling and the relative distances to them.

2-2-2. Step S120 (Virtual User Position Acquisition Process)

In Step S120, the virtual user position acquisition unit 120 acquires the virtual user position Uv corresponding to the real user position Ur acquired in Step S110. More specifically, the virtual user position acquisition unit 120 converts the real user position Ur into a corresponding virtual user position Uv based on the coordinate transformation information 210. The information on the virtual user position Uv is stored in the memory device 32.

2-2-3. Step S130 (Virtual Space Imaging Process)

In Step S130, the virtual space imaging unit 130 generates an image of the virtual space SPv viewed from the virtual user position Uv, that is, performs rendering. The image of the virtual space SPv viewed from the virtual user position Uv is hereinafter referred to as a "virtual space image IMG."

Figure 6:
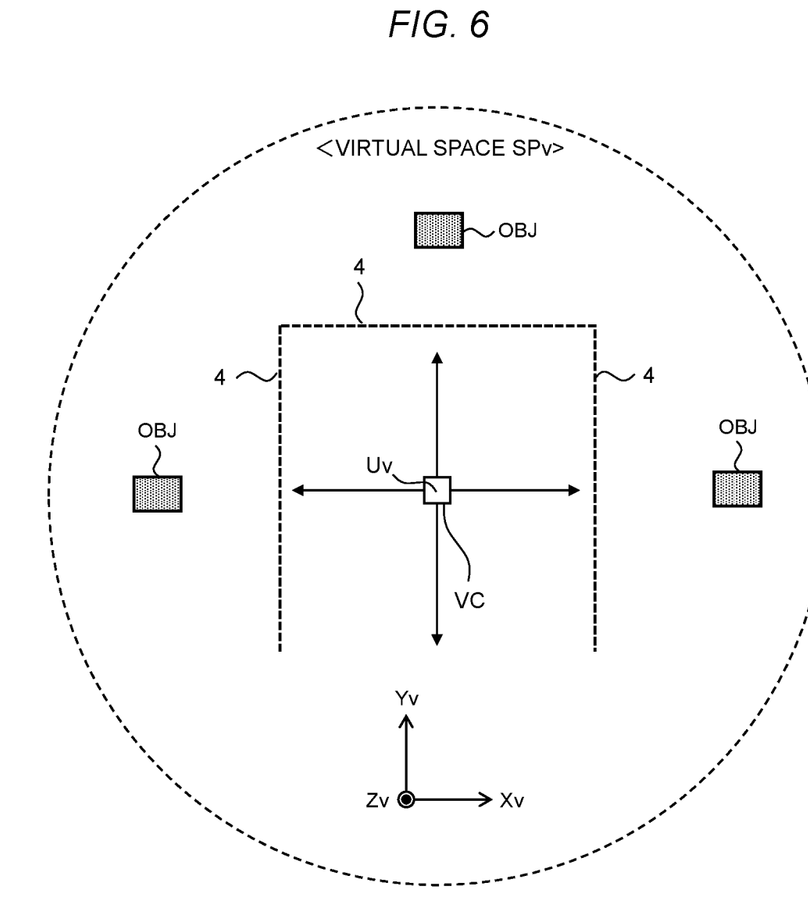
FIG. 6 is a conceptual diagram for explaining a virtual space imaging process (Step S130) according to an embodiment of the present disclosure.

FIG. 6 is a conceptual diagram for explaining Step S130. The virtual space imaging unit 130 places a virtual camera VC at the virtual user position Uv in the virtual space SPv. The virtual camera VC is a camera implemented by a software. Parameters of the virtual camera VC such as a focal length, a sensor size, and the like are set to be consistent with human vision. Then, the virtual space imaging unit 130 images the virtual space SPv by using the virtual camera VC placed at the virtual user position Uv. The image of the virtual space SPv captured by the virtual camera VC is the virtual space image IMG. The configuration of the virtual space SPv, that is, the position, the shape, and size of each object OBJ in the virtual space SPv (i.e., in the virtual space coordinate system) are obtained from the virtual space configuration information 220. Therefore, based on the virtual space configuration information 220, the virtual space imaging unit 130 is able to acquire the virtual space image IMG by imaging the virtual space SPv, that is, to perform rendering.

The virtual space imaging unit 130 may acquire the virtual space image IMG for each screen 4. The position of each screen 4 in the real space SPr is obtained from the screen information 230. The virtual space imaging unit 130 acquires a position of each screen 4 in the virtual space SPv based on the screen information 230 and the coordinate transformation information 210. Then, the virtual space imaging unit 130 uses the virtual camera VC to image the virtual space SPv in a direction from the virtual user position Uv to each screen 4. Alternatively, the virtual space imaging unit 130 may image the virtual space SPv in all-around direction from the virtual user position Uv.

It should be noted that in the present embodiment, information on a direction of the user 1's gaze is unnecessary. The virtual camera VC images the virtual space SPv in a predetermined direction regardless of the direction of the user 1's gaze. The predetermined direction includes the direction from the virtual user position Uv to each screen 4. The predetermined direction may be the all-around direction. The virtual space imaging unit 130 does not crop the virtual space image IMG in the direction of the user 1's gaze but acquires the virtual space image IMG that is visible from the virtual user position Uv. As a comparative example, according to the technique disclosed in Patent Literature 1 described above, an imaging direction of a virtual camera changes in conjunction with a change in a user's direction.

In the virtual space imaging process (Step S130), an ingenuity is exercised in order to suppress the feeling of strangeness when the virtual space image IMG is drawn on the screen 4. The ingenuity for suppressing the feeling of strangeness will be described in detail in Section 3 below.

2-2-4. Step S140 (Drawing Process)

In Step S140, the drawing unit 140 controls the drawing device 40 to draw the virtual space image IMG on the screen 4. At this time, the drawing unit 140 may draw the virtual space image IMG acquired for each screen 4 on for each screen 4. When the drawing device 40 is a projector, the drawing unit 140 controls the projector to project the virtual space image IMG onto the screen 4. As another example, when the drawing device 40 is a display device, the drawing unit 140 controls the display device to display the virtual space image IMG on the screen 4.

3. Features of Virtual Space Imaging Process (Step S130)

In the virtual space imaging process (Step S130), an ingenuity is exercised in order to suppress the feeling of strangeness when the virtual space image IMG is drawn on the screen 4. Hereinafter, three types of processes, "fixation of vanishing point", "lens shift", and "perspective adjustment" will be described as features of the virtual space imaging process according to the present embodiment. The effect of suppressing the user 1's feeling of strangeness can be at least obtained by at least one of the three types of characteristic processes. Of course, two or more of the three types of characteristic processes may be performed.

3-1. Fixation of Vanishing Point

Figure 7:
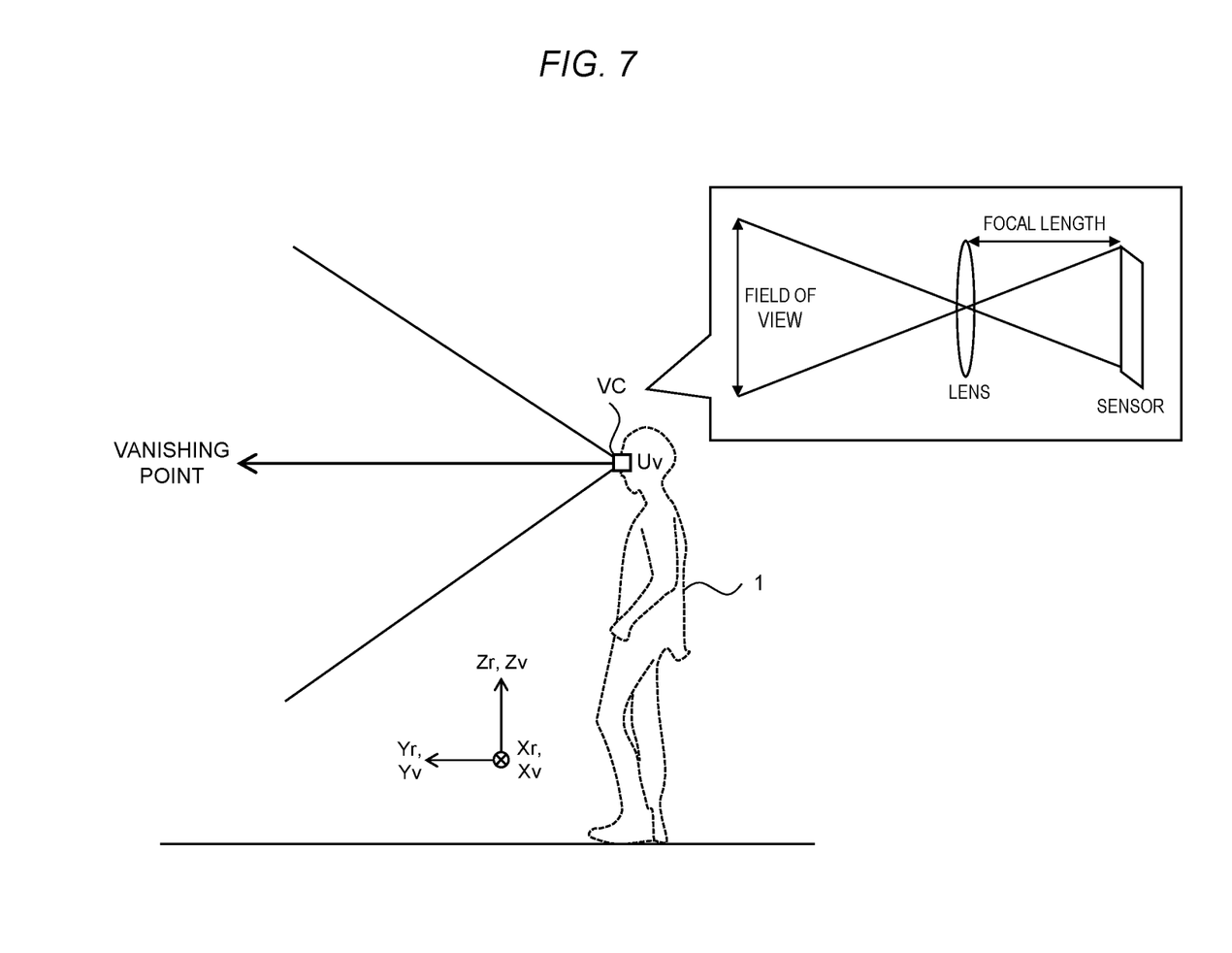
FIG. 7 is a conceptual diagram for explaining a first feature of a virtual space imaging process (Step S130) according to an embodiment of the present disclosure.

FIG. 7 is a conceptual diagram for explaining a first feature of the virtual space imaging process (Step S130). As the first feature, a vanishing point of the virtual space image IMG is fixed at a position straight in a horizontal direction as viewed from the virtual user position Uv. In other words, the virtual space imaging unit 130 acquires the virtual space image IMG such that the vanishing point exists in the horizontal direction as viewed from the virtual user position Uv.

Regardless of the direction of the user 1's gaze, the vanishing point is fixed in the horizontal direction as viewed from the virtual user position Uv. Even when the direction of the user 1's gaze moves up and down, the virtual camera VC is not rotated up and down. If the virtual camera VC is rotated up and down in conjunction with the moving up and down of the direction of the user 1's gaze, vertical lines of the virtual space image IMG drawn on the screen 4 converge and thus the virtual space image IMG looks distorted. According to the present embodiment, the vanishing point is fixed in the horizontal direction regardless of the direction of the user 1's gaze, and thus the virtual space image IMG drawn on the screen 4 is prevented from being distorted. That is to say, it is possible to suppress the user 1's feeling of strangeness.

Of course, when the user 1 moves the gaze in the real space SPr, a field of view of the user 1 changes accordingly. At that time, just as an object itself existing in the real space SPr does not change at all, so the virtual space image IMG itself drawn on the screen 4 around the user 1 does not change at all.

3-2. Lens Shift

Figure 8:
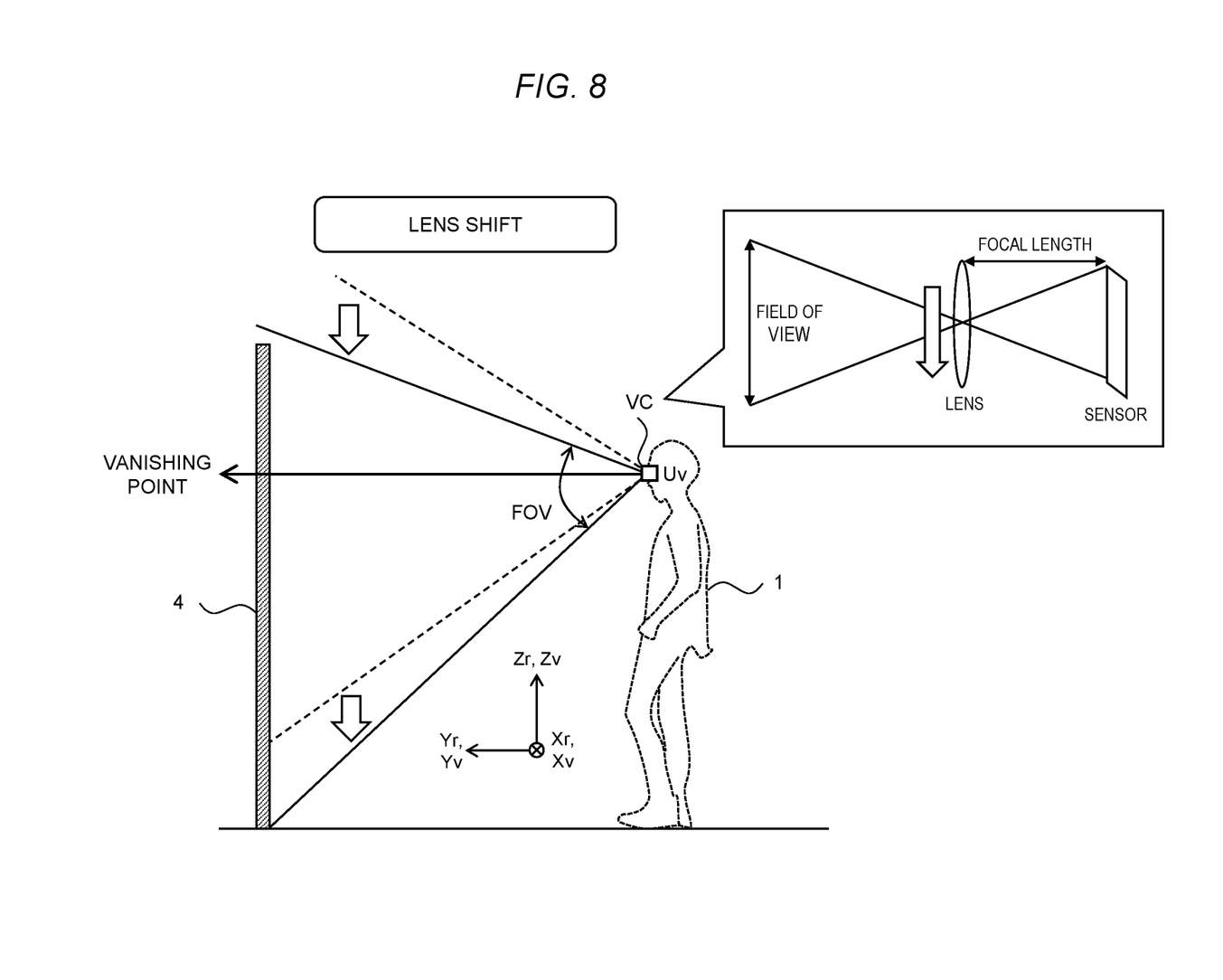
FIG. 8 is a conceptual diagram for explaining a second feature of a virtual space imaging process (Step S130) according to an embodiment of the present disclosure.

FIG. 8 is a conceptual diagram for explaining a second feature of the virtual space imaging process (Step S130). As the second feature, the virtual space imaging unit 130 performs a "lens shift process" that shifts a lens of the virtual camera VC such that whole of the screen 4 fits within a field of view of the virtual camera VC. In the lens shift process, the virtual space imaging unit 130 shifts the lens of the virtual camera VC in the vertical direction and/or the horizontal direction without changing a focal length. It should be noted that the position of the vanishing point is not changed by the lens shift.

An amount of lens shift required for fitting the whole of the screen 4 within the field of view of the virtual camera VC can be determined from the size of the screen 4 and a positional relationship between the real user position Ur and the screen 4. The position and the size of the screen 4 in the real space SPr are obtained from the screen information 230. Therefore, the virtual space imaging unit 130 is able to determine the amount of lens shift required for fitting the whole of the screen 4 within the field of view of the virtual camera VC, based on the real user position Ur and the screen information 230.

Performing such the lens shift process suppresses occurrence of an area in the screen 4 with nothing on it. Therefore, the user 1's sense of immersion in the VR increases.

Again, what is important here is not to rotate the virtual camera VC up and down. If the virtual camera VC is rotated up and down in order to fit the whole of the screen 4 within the field of view, the vertical lines of the virtual space image IMG drawn on the screen 4 converge and thus the virtual space image IMG looks distorted. According to the present embodiment, rather than rotating the virtual camera VC up and down, the lens shift process that shifts the lens of the virtual camera VC is performed. It is thus possible to prevent the virtual space image IMG drawn on the screen 4 from being distorted. That is to say, it is possible to suppress the user 1's feeling of strangeness.

3-3. Adjustment of Perspective

Figure 9:
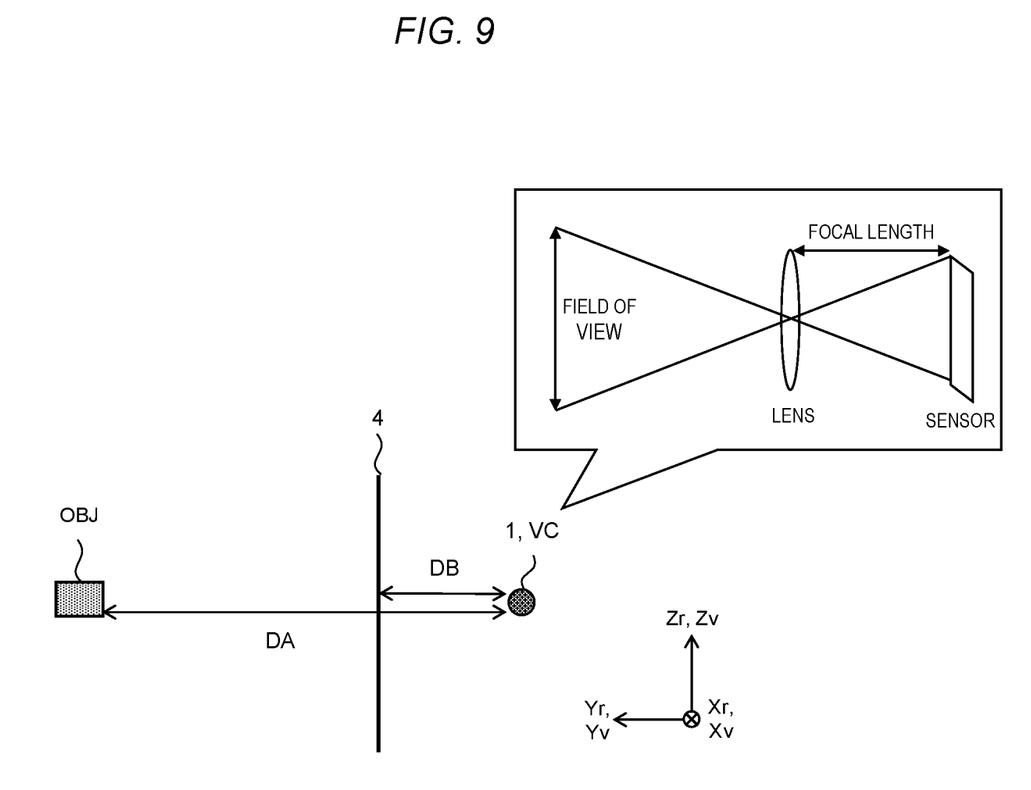
FIG. 9 is a conceptual diagram for explaining a third feature of a virtual space imaging process (Step S130) according to an embodiment of the present disclosure.

FIG. 9 is a conceptual diagram for explaining a third feature of the virtual space imaging process (Step S130). An image of an object OBJ is drawn on a screen 4. A distance DA is a distance between the user 1 (i.e., the virtual user position Uv) and the object OBJ. A distance DB is a distance between the user 1 (i.e., the real user position Ur) and the screen 4.

The virtual camera VC images the object OBJ distant from the virtual user position Uv by the distance DA to generate the virtual space image IMG including the object OBJ. If the image of the object OBJ existing the distance DA away is drawn as it is on the screen 4 existing the distance DB away, the object OBJ appears to exist at a position a distance DA+DB away when viewed from the real user position Ur. As an instance, let us consider a case where the distance DA is 10 m and the distance DB is 2 m. When the image of the object OBJ existing 10 m away is drawn as it is on the screen 4 existing 2 m away, that object OBJ appears to exist 12 m away. That is, perspective in the real space SPr is unnecessarily added in addition to perspective in the virtual space SPv. As a result, the object OBJ looks smaller than it originally is. This also causes the feeling of strangeness.

In view of the above, as the third feature, the virtual space imaging unit 130 cancels the perspective corresponding to the distance DB between the real user position Ur and the screen 4. More specifically, the virtual space imaging unit 130 adjusts a focal length of the virtual camera VC towards telephoto side such that the perspective corresponding to the distance DB between the real user position Ur and the screen 4 is cancelled. As a result, the unnecessary perspective is cancelled, the original sense of distance in the virtual space SPv is reproduced, and thus the user 1's feeling of strangeness is suppressed.

An adjustment amount of the focal length required for canceling the unnecessary perspective is determined based on the distance DB between the real user position Ur and the screen 4. The position of the screen 4 in the real space SPr is obtained from the screen information 230. Based on the the real user position Ur and the screen information 230, the virtual space imaging unit 130 is able to determine the adjustment amount of the focal length required for canceling the perspective corresponding to the distance DB. It should be noted that the virtual space imaging unit 130 performs the perspective adjustment for each screen 4.

4. Modification Example

As described above, a variety of processing is performed from the acquisition of the real user position Ur to the drawing of the virtual space image IMG. Therefore, the virtual space image IMG drawn on the screen 4 may be visually delayed by the processing time. In order to suppress such the delay, the modification example makes a prediction (estimation) of the real user position Ur in the future.

Figure 10:
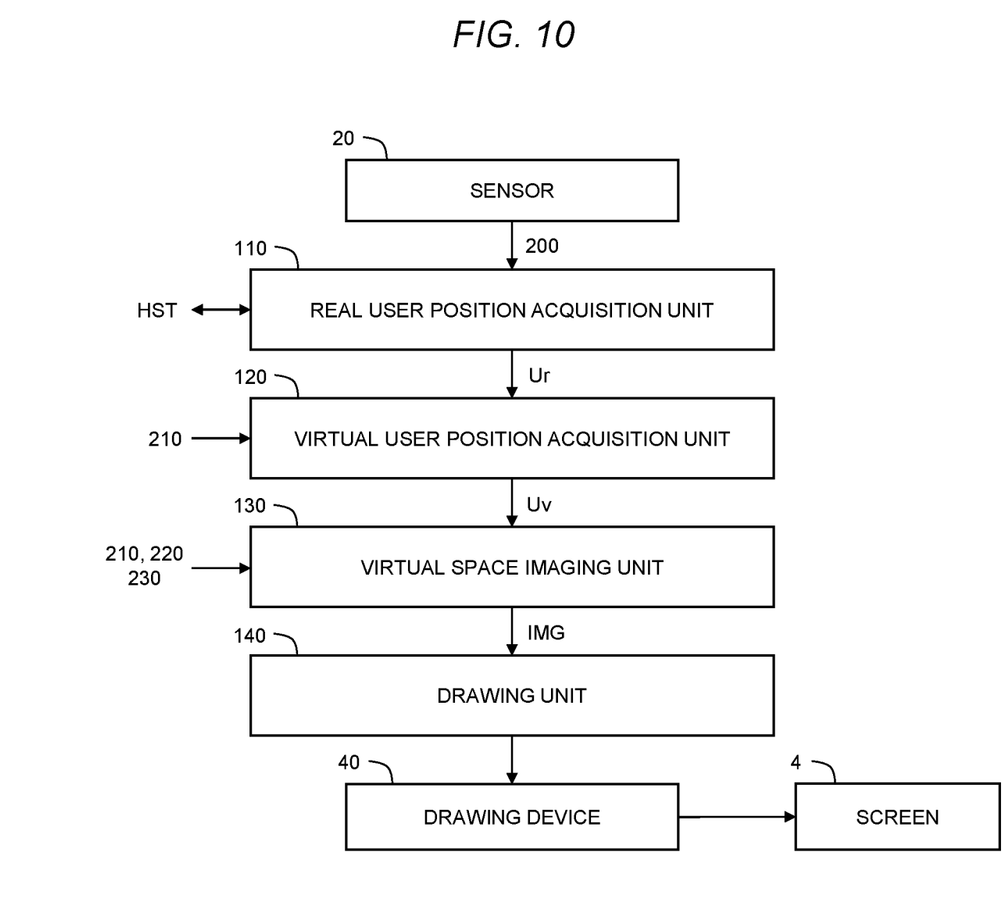
FIG. 10 is a block diagram for explaining a modification example of an embodiment of the present disclosure.

FIG. 10 is a block diagram for explaining the modification example. The description overlapping with the foregoing FIG. 4 will be omitted as appropriate. History information HST is information indicating a past history of the real user position Ur and is stored in the memory device 32.

In Step S110, the real user position acquisition unit 110 acquires the real user position Ur. The real user position acquisition unit 110 registers the acquired real user position Ur in the history information HST to update the history information HST. Further, the real user position acquisition unit 110 predicts (estimates) the real user position Ur in the future based on the past history of the real user position Ur indicated by the history information HST. For example, the real user position acquisition unit 110 calculates an acceleration of the real user position Ur based on the past history of the real user position Ur, and predicts the future real user position Ur from the acceleration. A Kalman filter or the like may be used for predicting the real user position Ur.

In Step S120, the virtual user position acquisition unit 120 acquires the virtual user position Uv corresponding to the real user position Ur in the future predicted in Step S110. In other words, the virtual user position acquisition unit 120 acquires the virtual user position Uv in the future. Then, in Step S130, the virtual space imaging unit 130 places the virtual camera VC at the future virtual user position Uv to perform the virtual space imaging process.

As described above, according to the modification example, the real user position Ur in the future is predicted, and the virtual space imaging processing is performed based on the virtual user position Uv in the future corresponding to the real user position Ur in the future. As a result, the visual delay of the virtual space image IMG drawn on the screen 4 is suppressed. This also contributes to the suppression of the user 1's feeling of strangeness.

5. Summary

As described above, according to the present embodiment, the wearless VR simulation is achieved. More specifically, the virtual camera VC is placed at the virtual user position Uv corresponding to the real user position Ur, and the virtual space image IMG is acquired by imaging the virtual space SPv by using the virtual camera VC. The virtual space image IMG is drawn on the screen 4 that is installed at a position distant from the user 1 and does not integrally move with the user 1.

Three types of processes, "fixation of vanishing point", "lens shift", and "perspective adjustment" have been described as ingenuities for suppressing the feeling of strangeness when the virtual space image IMG is drawn on the screen 4 (see Section 3). The effect of suppressing the user 1's feeling of strangeness can be at least obtained by at least one of the three types of characteristic processes. Of course, two or more of the three types of characteristic processes may be performed.

The wearless VR simulation according to the present embodiment does not depend on the position, the orientation, and the shape of the screen 4. It is also possible to make a hexahedral VR experience room with a ceiling, a floor, and front, rear, left, and right walls. It is also possible to further divide the screen 4 to realize a screen configuration with a more complicated shape. It is also possible to make a spherical VR experience room.

What is claimed is:

1. A virtual reality simulator comprising:
   one or more processors; and
   one or more memory devices storing virtual space configuration information indicating a configuration of a virtual space, wherein
   the one or more processors are configured to execute:
      a process of acquiring information on a real user position that is a position of a head of a user in a real space;
      a process of acquiring information on a virtual user position that is a position in the virtual space corresponding to the real user position;
      an imaging process that acquires a virtual space image by imaging the virtual space by using a camera placed at the virtual user position in the virtual space, based on the virtual space configuration information; and
      a process of projecting or displaying the virtual space image on a screen that is installed at a position distant from the user in the real space and does not integrally move with the user, and
   the imaging process includes a perspective adjustment process that adjusts a focal length of the camera such that perspective corresponding to a distance between the real user position and the screen is cancelled.

2. The virtual reality simulator according to claim 1, wherein
   the one or more processors are further configured to:
      predict the real user position in future based on a past history of the real user position; and
      execute the imaging process based on the virtual user position in future corresponding to the real user position in future.

3. A non-transitory computer-readable recording medium on which a virtual reality simulation program is recorded,
   the virtual reality simulation program being configured to, when executed by a computer, cause the computer to execute:
      a process of acquiring information on a real user position that is a position of a head of a user in a real space;
      a process of acquiring information on a virtual user position that is a position in a virtual space corresponding to the real user position;
      an imaging process that acquires a virtual space image by imaging the virtual space by using a camera placed at the virtual user position in the virtual space, based on virtual space configuration information indicating a configuration of the virtual space; and
      a process of projecting or displaying the virtual space image on a screen that is installed at a position distant from the user in the real space and does not integrally move with the user, wherein
   the imaging process includes a perspective adjustment process that adjusts a focal length of the camera such that perspective corresponding to a distance between the real user position and the screen is cancelled.

* * * * *